(12) United States Patent
Chhabra et al.

(10) Patent No.: US 8,763,111 B2
(45) Date of Patent: *Jun. 24, 2014

(54) ENABLING A SERVICE TO RETURN LOST LAPTOPS

(71) Applicant: Intel Corporation, Santa Clara, CA (US)

(72) Inventors: Jasmeet Chhabra, Hillsboro, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,990

(22) Filed: Nov. 26, 2012

(65) Prior Publication Data

US 2013/0091590 A1 Apr. 11, 2013

Related U.S. Application Data

(63) Continuation of application No. 12/317,946, filed on Dec. 30, 2008, now Pat. No. 8,317,878.

(51) Int. Cl.
*G06F 7/04* (2006.01)
*G06F 1/26* (2006.01)

(52) U.S. Cl.
USPC ............................................. 726/17; 726/35

(58) Field of Classification Search
USPC .......................................................... 726/35
See application file for complete search history.

(56) References Cited

U.S. PATENT DOCUMENTS

| | | | |
|---|---|---|---|
| 6,480,096 B1 * | 11/2002 | Gutman et al. | 340/5.31 |
| 8,317,878 B2 | 11/2012 | Chhabra et al. | |
| 2002/0016838 A1 * | 2/2002 | Geluc et al. | 709/224 |
| 2003/0074577 A1 * | 4/2003 | Bean et al. | 713/200 |
| 2005/0073389 A1 * | 4/2005 | Chandley | 340/5.31 |
| 2006/0031399 A1 * | 2/2006 | Sherman et al. | 709/217 |
| 2006/0293029 A1 * | 12/2006 | Jha et al. | 455/411 |
| 2008/0079581 A1 * | 4/2008 | Price | 340/572.1 |
| 2009/0002162 A1 * | 1/2009 | Glendinning | 340/571 |
| 2009/0089887 A1 * | 4/2009 | Aissi et al. | 726/35 |
| 2009/0249460 A1 * | 10/2009 | Fitzgerald et al. | 726/7 |
| 2009/0253410 A1 * | 10/2009 | Fitzgerald et al. | 455/411 |

* cited by examiner

*Primary Examiner* — Teshome Hailu
(74) *Attorney, Agent, or Firm* — Barnes & Thornburg

(57) ABSTRACT

A method, system, and computer-readable storage medium for providing a unique identifier for a computer system and a message from a service external to the computer system, such as a laptop return service, for display when the computer system is powered on. The computer system is configured to restrict functionality until the service authorizes restoration of full functionality of the computer system. The message includes contact information for the laptop return service and, when the service is contacted, the service sends an instruction to return the computer system to full functionality. Other embodiments are described and claimed.

20 Claims, 4 Drawing Sheets

ENABLING A SERVICE TO RETURN LOST LAPTOPS

CROSS-REFERENCE TO RELATED U.S. PATENT APPLICATION

This application is a continuation application of U.S. application Ser. No. 12/317,946, entitled "ENABLING A SERVICE TO RETURN LOST LAPTOPS," filed on Dec. 30, 2008 and now U.S. Pat. No. 8,317,878.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to protection of computer systems and data stored on computer systems.

BACKGROUND

A laptop computer, also known as a notebook computer, is a small personal computer designed for mobile use. As workers have become increasingly mobile in today's 24×7 environment, the popularity of laptops has grown. As a result, corporate data have become increasingly mobile and distributed. Data are routinely taken out of physically secured facilities to accommodate workers who travel or have flexible working habits. All of these forces require that both computer systems and the data stored on them be protected both while in transit and while at rest.

Passwords are routinely used to prevent unauthorized access to computer systems. Data stored on computer systems are often encrypted as well, thereby preventing the unauthorized use of data stored on lost or stolen storage devices. Other protection schemes include anti-theft technology that enables a laptop to be locked by a remote server when the laptop is reported as lost or stolen. These protection schemes help to prevent the inevitable loss and theft of laptops from becoming the loss and theft of the data stored on the laptops. Normally, a laptop will not be labeled with contact information for the owner for privacy and security reasons, as well as to discourage attempts to use the owner's contact information to guess the system passwords. A label containing only an identifier for the laptop can be physically affixed to the laptop, along with contact information for a return service such as stuffbak.com, but such physical labels can be easily detached. These protective measures can make it difficult to obtain information about the owner of a laptop when the laptop is lost and a finder wishes to return the laptop to its rightful owner.

DETAILED DESCRIPTION

Embodiments of the present invention may provide a method, apparatus, system, and computer program product for enabling a laptop return service.

Figure 1:
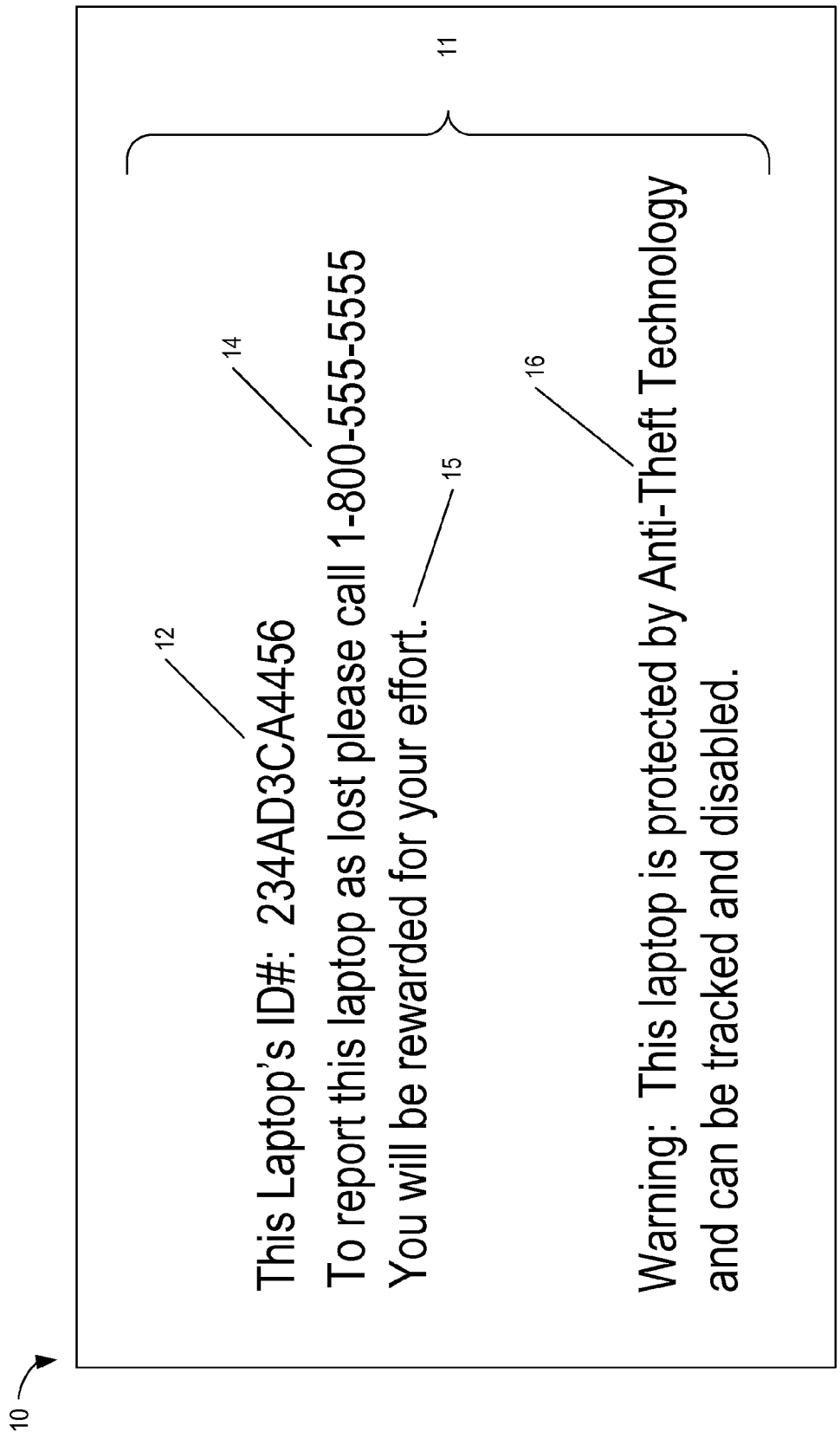
FIG. 1 illustrates a computer screen notifying a finder of a laptop return service in accordance with an embodiment of the present invention.

FIG. 1 illustrates a computer screen notifying a finder of a laptop return service in accordance with an embodiment of the present invention. Upon turning on power for the laptop, an initial screen similar to computer screen 10 is presented. In the embodiment shown, computer screen 10 displays message 11, which includes a laptop identification number 12, contact information 14 for a laptop return service, reward text 15, and warning text 16. Laptop identification number 12 is a unique identifier for the laptop and can be used to retrieve the owner's identification information when the laptop return service is contacted by a finder. Generation, storage, and communication of laptop identification number 12 to the laptop return service are discussed in further detail below.

Reward text 15 indicates that a reward will be paid for returning the laptop, and warning text 16 indicates that the laptop is protected by anti-theft technology to inform the finder that the laptop can be tracked and disabled. Message 11 is intended to discourage tampering with the laptop to try to access the data stored on the laptop and to encourage the return of the laptop to its rightful owner. One of ordinary skill in the art will recognize that the particular information included in message 11 may be varied and is configurable. Furthermore, message 11 may be combined with a screen for a password that is required to use the computer system. In addition, a message such as message 11 may be shown every time the laptop is powered on, perhaps in conjunction with the system password screen, or alternatively such a message may be shown only after the laptop has been reported as lost or stolen and in lieu of presenting a password screen.

Figure 2:
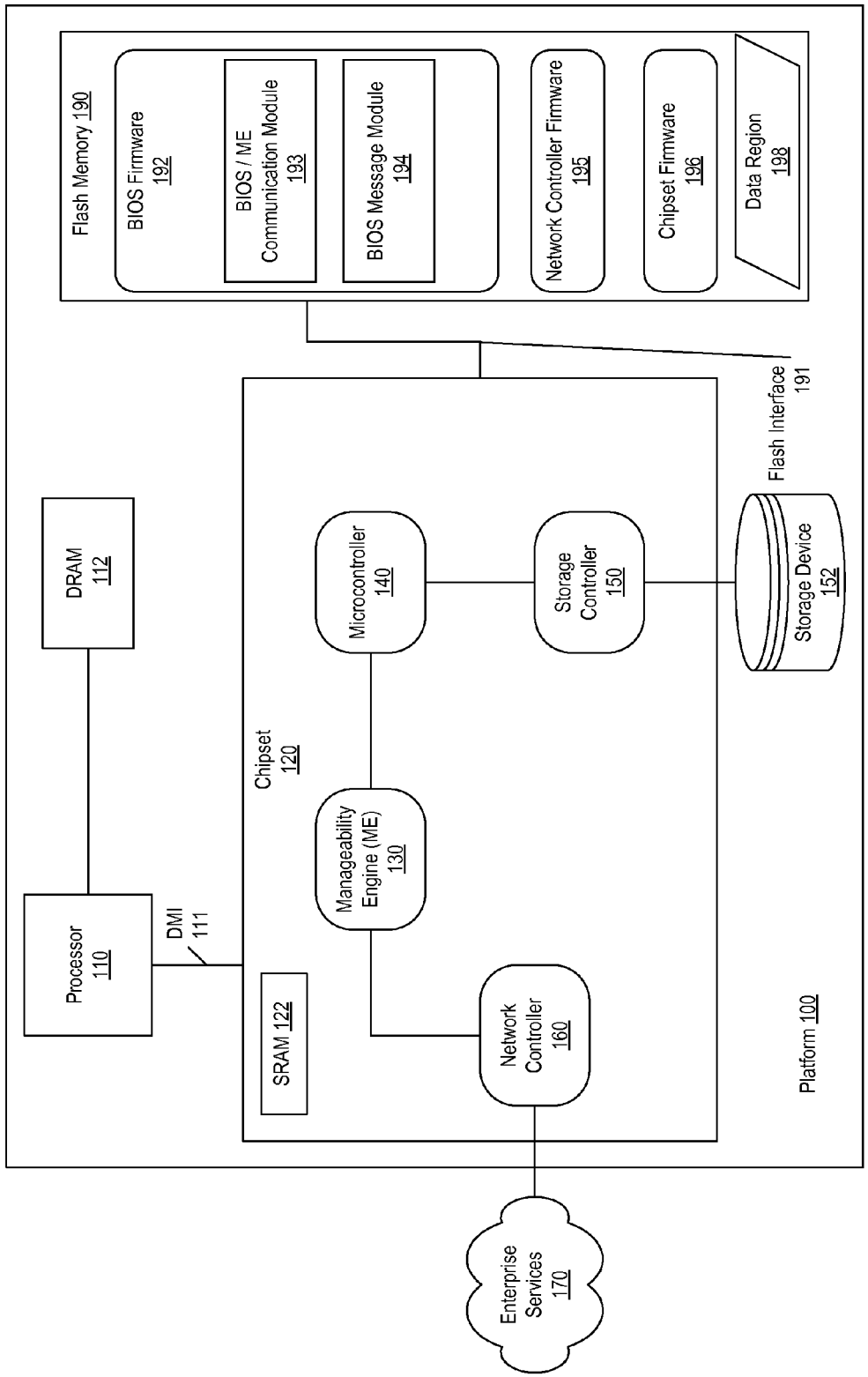
FIG. 2 is a block diagram of a system configured to be recoverable using a laptop return service in accordance with one embodiment of the invention.

FIG. 2 is a block diagram of a system configured to be recoverable using a laptop return service in accordance with one embodiment of the invention. Platform 100, which corresponds to a laptop computer system, includes a processor 110 connected to a chipset 120 via a desktop management interface (DMI) 111. Chipset 120 includes a manageability engine (ME) 130, which may be implemented as an embedded microprocessor that operates independently of host processor 110, to manage the configuration and operation of platform 100. In one embodiment, manageability engine (ME) 130 authenticates users, controls access to peripheral devices, manages encryption keys for protection of data stored on storage devices of platform 100, provides anti-theft protection, and provides an interface to enterprise services 170 via network controller 160. Using enterprise services 170, manageability engine (ME) 130 maintains consistency with enterprise-wide policies for configuration and management of platforms such as platform 100, including providing a service for the return of the laptop in accordance with one embodiment of the invention.

In one embodiment, microcontroller 140 is a general-purpose controller that performs storage command decoding and other accelerated operations. Manageability engine (ME) 130 controls the behavior of microcontroller 140, which in turn controls the behavior of storage controller 150.

Platform 100 further includes memory devices such as dynamic random access memory (DRAM) 112, static random access memory (SRAM) 122 within chipset 120, and flash memory 190, as well as storage device 152 accessible via storage controller 150. Flash memory 190 is accessible by chipset 120 via flash interface 191. Data stored on storage device 152 and/or in memory devices DRAM 112, SRAM 122, and flash memory 190 may be encrypted.

Flash memory 190 contains firmware used to initialize platform 100. This initialization firmware includes Basic Input/Output System (BIOS) firmware 192 to identify and initialize system component hardware (such as the video display card and hard disk) and some other hardware devices including manageability engine 130. BIOS firmware 192 prepares system component hardware of platform 100 to operate in a known low capability state, so other software programs stored on various media, including an operating system, can be loaded, executed, and given control of platform 100. BIOS firmware 192 includes BIOS/ME communication module 193, which enables the initial configuration of manageability engine (ME) 130 during the boot process. In one embodiment, manageability engine (ME) 130 registers with BIOS/ME communication module 193 to receive a notification just before an operating system is loaded for platform 100. This notification enables manageability engine (ME) 130 to perform certain instructions in preparation for the operating system being loaded.

BIOS firmware 192 also includes BIOS message module 194, which is configured to provide computer screen 10 of FIG. 1 when platform 100 is powered on. BIOS firmware 192 can be configured to call BIOS message module 194 to display an initial screen similar to computer screen 10 each time that platform 100 is powered on. Alternatively, BIOS firmware 192 can be configured to selectively call BIOS message module 194 when platform 100 is powered on only after platform 100 has been reported as lost or stolen.

Flash memory 190 also includes network controller firmware 195 to configure network controller 160, and chipset firmware 196 to configure chipset 120. Flash memory 190 also contains a data region 198. In one embodiment, data region 198 is encrypted and may only be read by manageability engine (ME) 130. Information displayed in computer screen 10 of FIG. 1, such as the laptop identification number 12, contact information 14 for the laptop return service, and warning text 16 may be stored in data region 198 of flash memory 190 or on storage device 152. BIOS message module 194 may request the information to be displayed in computer screen 10 from manageability engine (ME) 130 via BIOS/ME communication module 193. In response to this request, manageability engine (ME) 130 provides the information to be displayed to BIOS message module 194.

Figure 3:
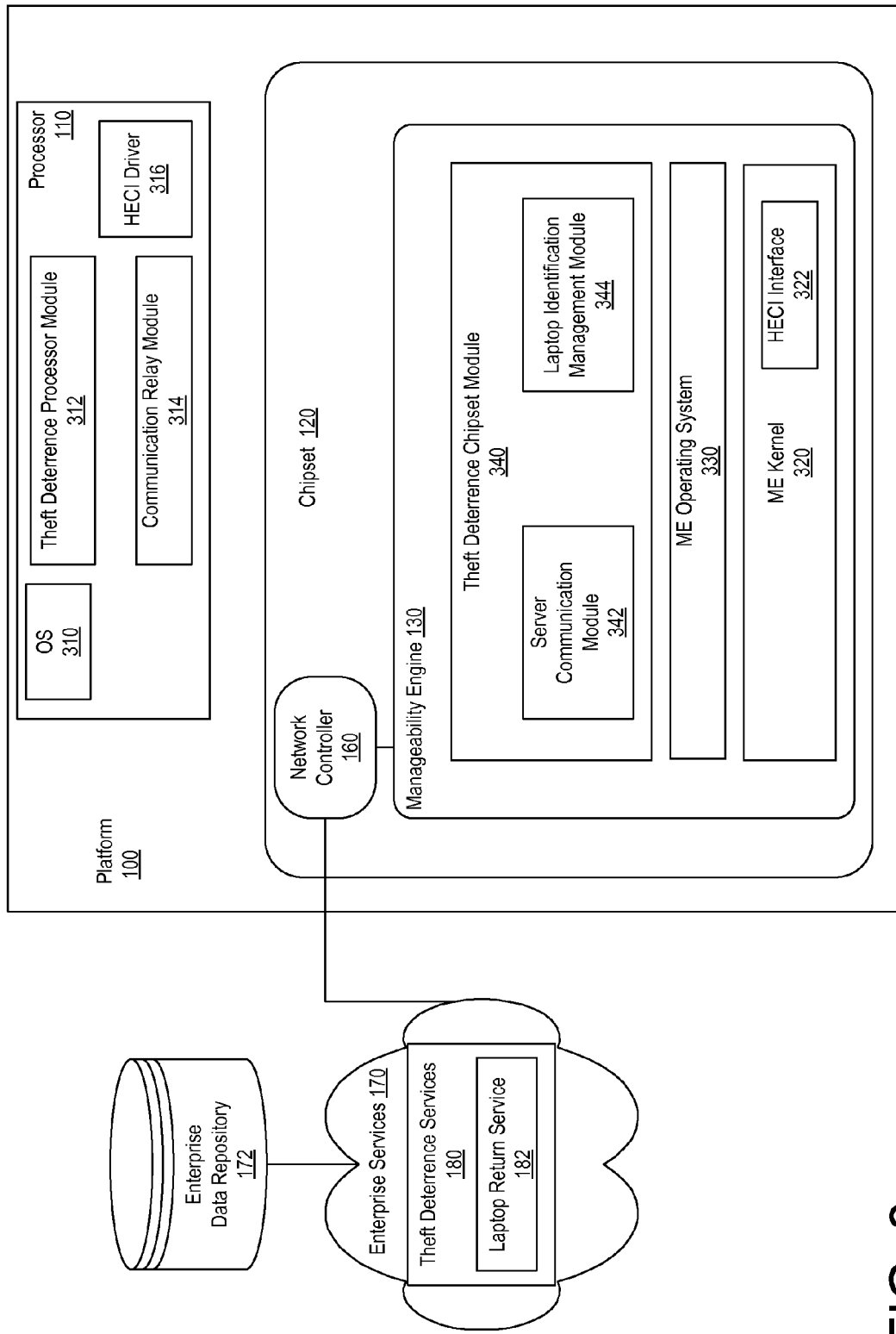
FIG. 3 shows further details of the system of FIG. 2 in enabling a laptop return service in accordance with one embodiment of the invention.

FIG. 3 shows further details of the processor 110, manageability engine (ME) 130, and enterprise services 170 of FIG. 2 in enabling a laptop return service in accordance with one embodiment of the present invention. Processor 110 is shown after an operating system (OS) 310 and other software including a theft deterrence processor module 312, communication relay module 314, and Host Embedded Controller Interface (HECI) driver 316 have been loaded. Communication relay module 314 and HECI driver 316 assist in communication between theft deterrence processor module 312 and counterpart theft deterrence components within chipset 120.

Within chipset 120, manageability engine 130 is shown after chipset firmware 196 of FIG. 2 has been loaded. Manageability engine 130 includes ME kernel 320, which provides basic operational capabilities to manageability engine 130 and includes HECI interface 322 for communication with the processor 110 HECI driver 316. Manageability engine 130 also includes operating system 330 and theft deterrence chipset module 340, which includes a server communication module 342 and a laptop identification management module 344. In one embodiment, server communication module 342 facilitates communication between theft deterrence components of platform 100 with theft deterrence components of enterprise services 170 via network controller 160. Server communication module 342 may also interact with processor 110 communication relay module 314 to communicate with enterprise services 170.

Enterprise services 170 is shown as including theft deterrence services 180, which includes laptop return service 182. One of skill in the art will recognize that laptop return service 182 may alternatively be implemented as a standalone service rather than as part of a larger enterprise services module or theft deterrence package. In the following description of the embodiment where laptop return service 182 is described as being part of theft deterrence services 180, functionality is described as being performed by either theft deterrence services 180 or laptop return service 182. One of skill in the art will understand that theft deterrence services 180 and/or laptop return service 182 may be implemented as software running on server computer systems. In the embodiment shown, enterprise services 170 have an enterprise data repository 172 to store information such as laptop identification numbers and associated user information for the laptop return service that is used by theft deterrence services 180 and/or laptop return services 182.

A user may enroll his or her laptop with theft deterrence services 180 and/or laptop return service 182. A service provider for theft deterrence services 180/laptop return service 182 may provide a website to enable enrollment of laptops. The website would then download software to the laptop that calls theft deterrence processor module 312 and/or theft deterrence chipset module 340 to enroll the laptop to receive theft deterrence services 180 and/or laptop return service 182. Alternatively, theft deterrence processor module 312 may be configured to provide an enrollment screen (not shown) to allow a user of platform 100 to initially configure platform 100 to receive theft deterrence services 180 and/or laptop return service 182.

If the user chooses to enroll his or her laptop in theft deterrence services 180 and/or laptop return service 182, a laptop identification number (such as laptop identification number 12 of FIG. 1) is generated by laptop identification management module 344 within theft deterrence chipset module 340 and securely stored. The laptop identification number can be used as a key to retrieve the user's contact information by laptop return service 182 is contacted by a finder. As mentioned previously, the laptop identification number may be stored in data region 198 of flash memory 190 or in storage device 152. The laptop identification number information may be encrypted. The laptop identification number is also communicated via server communication module 342 of theft deterrence chipset module 340 to theft deterrence services 180.

The laptop identification number is stored by enterprise services 170 in an enterprise data repository 172. User contact information for notifying the user when the laptop return service 182 is contacted may also be stored in enterprise data repository 172. Information such as message 11 of computer screen 10 of FIG. 1 to be displayed when platform 100 is powered on can be provided by theft deterrence services 180 back to laptop identification management module 344 via server communication module 342. In response to receiving the message to be displayed, laptop identification management module 344 can store the message in data region 198 of flash memory 190 or in storage device 152. The message may be encrypted prior to storing the message. Laptop identification management module 344 may also securely store the user's contact information in the same location as the laptop identification number, in addition to storing the user's contact information in enterprise data repository 172.

Theft deterrence services 180 and/or laptop return service 182 may be configured to receive a notification that a computer system such as platform 100 is lost or stolen. The notification may include the laptop identification number if sent by theft deterrence chipset module 340. Alternatively, in response to receiving a notification that the laptop has been lost or stolen from someone who can provide the user's contact information associated with the laptop, theft deterrence services 180 and/or laptop return service 182 may obtain the laptop identification number by using the user's contact information to retrieve the laptop identification number from enterprise data repository 172. In response to the notification that the laptop has been lost or stolen, theft deterrence services 180 and/or laptop return service 182 may send an instruction to the laptop computer system to restrict functionality of the computer system. Theft deterrence services 180 and/or laptop return service 182 may also contact the user to inform the user of the notification that the laptop is lost or stolen.

In addition to the message to be displayed, theft deterrence services 180 may provide an instruction for reconfiguring the laptop that would restrict functionality of the laptop after the laptop has been reported as lost or stolen until the laptop return service 182 is contacted. This instruction may, for example, reconfigure platform 100 so that all functionality is disabled, prevent the operating system from loading, or enable the operating system to be loaded but restrict other functions that can be performed after the operating system is loaded. In response to such an instruction from theft deterrence services 180 or laptop return service 182, theft deterrence chipset module 340 may perform actions to mitigate the theft or loss in accordance with the instruction received. These actions may include disabling processor 110 or parts of chipset 120, disallowing access to flash memory 190, reconfiguring BIOS firmware 192, or reconfiguring other portions of manageability engine (ME) 130 in accordance with the instruction. An example of an instruction that restricts functionality of the computer system while allowing the computer system to remain operational is an instruction that disables access to the laptop identification number after an operating system is loaded. This restriction would prevent applications running under the operating system from accessing the laptop identification number, thereby making the laptop identification number available only during initialization of the system by pre-OS firmware.

Theft deterrence services 180 and/or laptop return service 182 may provide an instruction to configure the laptop to restore the laptop to full functionality after laptop return service 182 is contacted and the laptop is returned to its owner. In response to receiving a notification that the computer system is found, theft deterrence services 180 and/or laptop return service 182 may send an instruction to the computer system to authorize restoration of full functionality of the computer system. In response to the notification that the laptop is found, theft deterrence services 180 and/or laptop return service 182 may also retrieve user contact information associated with laptop identification number and contact the user.

Theft deterrence chipset module 340 also can be configured to respond to events such as a theft notification event by theft deterrence services 180. Such a theft notification event may be triggered, for example, when manageability engine (ME) 130 observes a maximum number of failed login attempts and notifies theft deterrence services 180 and/or laptop return service 182 or when a theft is reported by a user. In one embodiment, platform 100 may be equipped with sensing hardware (not shown) that may also be configured to send a signal to theft deterrence services 180 if the laptop is moved away from an authorized location. In response to a signal from the sensing hardware, theft deterrence services 180 and/or laptop return service 182 may send an instruction for reconfiguration of platform 100 as described above.

Figure 4:
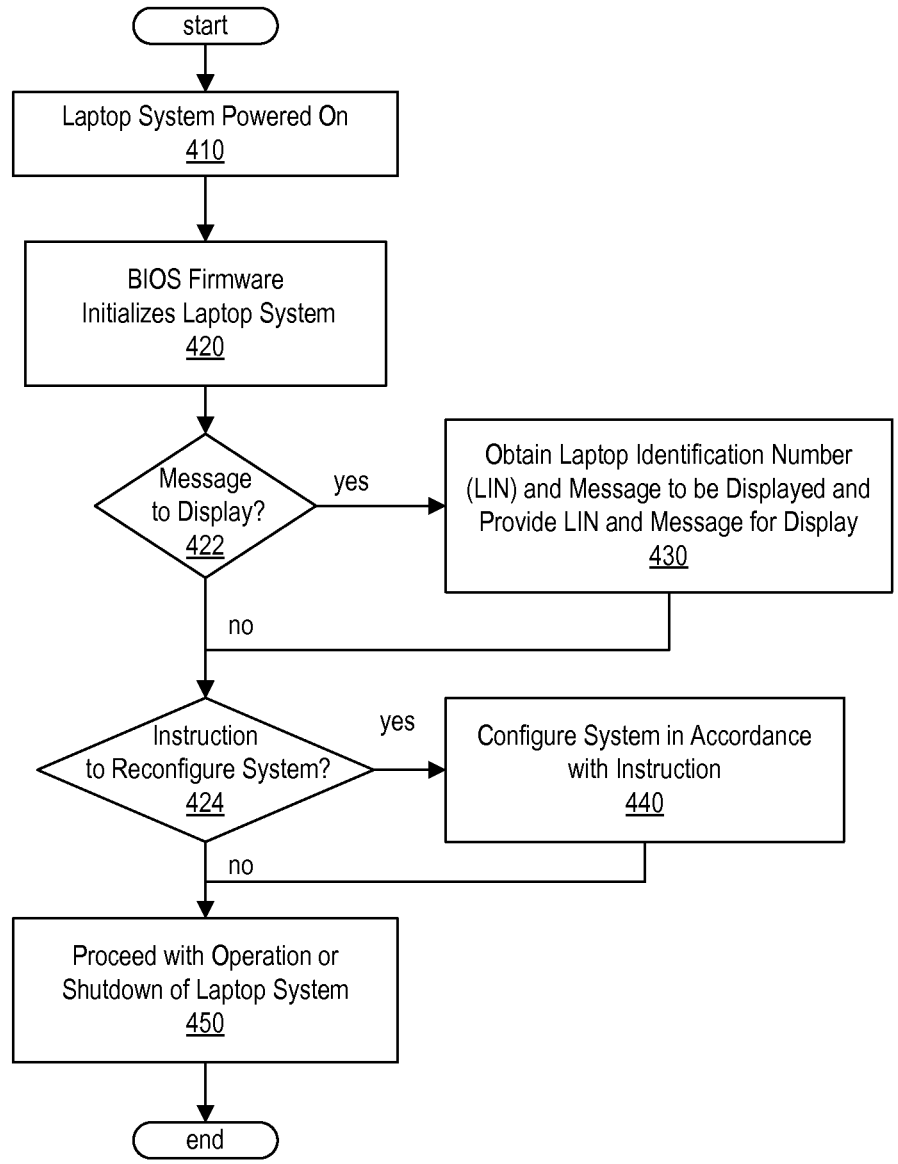
FIG. 4 is a flowchart of the operation of the system of FIGS. 1-3 in enabling a laptop return service.

FIG. 4 is a flowchart of the operation of the system of FIGS. 1-3 in enabling a laptop return service. The steps performed in FIG. 4 are described as being performed by the system components of FIGS. 1-3. In "Laptop System Powered On" step 410, platform 100 receives power. Control proceeds to "BIOS Firmware Initializes Laptop System" step 420, where BIOS firmware 192 executes to initialize platform 100. As part of this initialization, BIOS firmware 192 proceeds to "Message to Display?" decision point 422, where BIOS firmware 192 determines whether there is a message from enterprise services 170, theft deterrence services 180, or laptop return service 182 to display. An example of such a message is message 11 of FIG. 1. If there is a message to be displayed, control proceeds to "Obtain Laptop Identification Number (LIN) and Message to be Displayed and Provide LIN and Message for Display" step 430. BIOS firmware 192 may call BIOS message module 194 to obtain the laptop identification number and message. BIOS message module 194 may obtain the laptop identification number and message from theft deterrence chipset module 340 via BIOS/ME communication module 193 and provide the laptop identification number and message for display.

From "Obtain Laptop Identification Number (LIN) and Message to be Displayed and Provide LIN and Message for Display" step 430, or when no message is to be displayed at "Message to Display?" decision point 422, control proceeds to "Instruction to Reconfigure System?" decision point 424. For example, an instruction may have been received from theft deterrence services 180 to disable the system due to a theft notification, and BIOS firmware 192 may have been replaced with an instruction that disables the system or restricts functionality of the system while allowing the system to remain operational. Alternatively, BIOS firmware 192 may include an instruction to call manageability engine (ME) 130, which may check for instructions to reconfigure the system. If such an instruction has been received, control proceeds to "Configure System in Accordance with Instruction" step 440, where the laptop system is configured in accordance with the instruction.

Control proceeds from "Configure System in Accordance with Instruction" step 440 or from "Instruction to Reconfigure System?" decision point 424 when no instruction has been received to "Proceed with Operation or Shutdown of Laptop System" step 450. The laptop system continues operation in accordance with the current configuration or shuts down as instructed.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for providing a lost laptop return service. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

The invention claimed is:

1. A computing device comprising:
a memory having an encrypted data region; and
a theft deterrence module to (i) generate a unique identifier for the computing device, (ii) receive a message from a service external to the computing device for display when the computing device is powered on, (iii) store the generated unique identifier and the message received from the service external to the computing device in the encrypted data region of the memory, (iv) provide the generated unique identifier and the message stored in the encrypted data region of the memory for display in response to receiving a request to display the generated unique identifier and the message, and (v) configure the computing device to restrict functionality of the computing device until the service authorizes restoration of full functionality of the computing device.

2. The computing device of claim 1, wherein to provide the generated unique identifier and the message for display comprises to selectively provide the unique identifier and the message for display only after receiving a communication from the service.

3. The computing device of claim 1, wherein to configure the computing device to restrict the functionality of the computing device comprises to disable the computing device.

4. The computing device of claim 1, wherein to configure the computing device to restrict the functionality of the computing device comprises to restrict the functionality of the computing device in accordance with an instruction from the service.

5. The computing device of claim 4, wherein to restrict the functionality of the computing device in accordance with the instruction from the service comprises to disable access to the unique identifier after an operating system is loaded.

6. The computing device of claim 1, wherein the theft deterrence module is further to configure the computing device to restore the full functionality of the computing device in response to an instruction authorizing the restoration from the service.

7. The computing device of claim 1, wherein the encrypted data region of memory of the computing device is accessible to the theft deterrence module and inaccessible to other components of the computing device.

8. A non-transitory computer-readable storage medium comprising a plurality of instructions, that in response to be executed, result in a computing device:
generating a unique identifier for the computing device in a theft deterrence module of the computing device;
receiving a message from a service external to the computing device for display when the computing device is powered on;
storing the generated unique identifier and the message received from the service external to the computing device in an encrypted data region of memory of the computing device;
providing the generated unique identifier and the message stored in the encrypted data region of memory for display in response to receiving a request to display the generated unique identifier and the message; and
restricting functionality of the computing device until the service authorizes restoration of full functionality of the computing device.

9. The non-transitory computer-readable storage medium of claim 8, wherein providing the unique identifier for the computing device and the message for display comprises providing the unique identifier for the computing device and the message for display only after receiving a communication from the service.

10. The non-transitory computer-readable storage medium of claim 8, wherein restricting the functionality of the computing device comprises disabling the computing device.

11. The non-transitory computer-readable storage medium of claim 8, wherein restricting the functionality of the computing device comprises restricting the functionality of the computing device in accordance with an instruction from the service.

12. The non-transitory computer-readable storage medium of claim 11, wherein restricting the functionality of the computing device in accordance with the instruction from the service comprises disabling access to the unique identifier after an operating system is loaded.

13. The non-transitory computer-readable storage medium of claim 8, further comprising instructions, that in response to being executed, result in the computing device restoring the full functionality of the computing device in response to an instruction authorizing the restoration from the service.

14. The non-transitory computer-readable storage medium of claim 8, wherein the encrypted data region of memory of the computing device being accessible to the theft deterrence module and inaccessible to other components of the computing device.

15. A server for providing theft deterrence services, the server comprising:
   a processor; and
   a memory having stored therein a plurality of instructions, that when executed by the processor, cause the server to:
      receive notification over a network from a computing device that the computing device is at least one of lost and stolen, the notification comprises a unique identifier generated by a theft deterrence module of the computing device;
      retrieve, in response to receiving the notification, information associated with the computing device from a data repository using the unique identifier; and
      send (i) a message that comprises the retrieved information associated with the computing device and (ii) an instruction over the network to the theft deterrence module of the computing device, the message for display on the computing device and the instruction to restrict functionality of the computing device.

16. The server of claim 15, wherein the message for display on the computing device and the instruction to restrict functionality of the computing device prior to loading an operating system on the computing device.

17. The server of claim 15, wherein the instruction to restrict functionality of the computing device comprises an instruction to disable the computing device.

18. The server of claim 15, wherein the instruction to restrict functionality of the computing device comprises an instruction to disable access to the unique identifier after loading an operating system on the computing device.

19. The server of claim 15, wherein the memory further comprises instructions, that when executed by the processor, cause the server to:
   receive a second notification indicating that the computing device is found; and
   send another instruction to the computing device to authorize restoration of full functionality of the computing device.

20. The server of claim 15, wherein the memory further comprises instructions, that when executed by the processor, cause the server to:
   retrieve user contact information associated with the unique identifier; and
   contact a user of the computing device using the retrieved user contact information.

* * * * *